March 7, 1950    R. L. JEAN-BAPTISTE SANMORI    2,499,684
BRAKE DEVICE
Filed Jan. 12, 1946    2 Sheets-Sheet 1
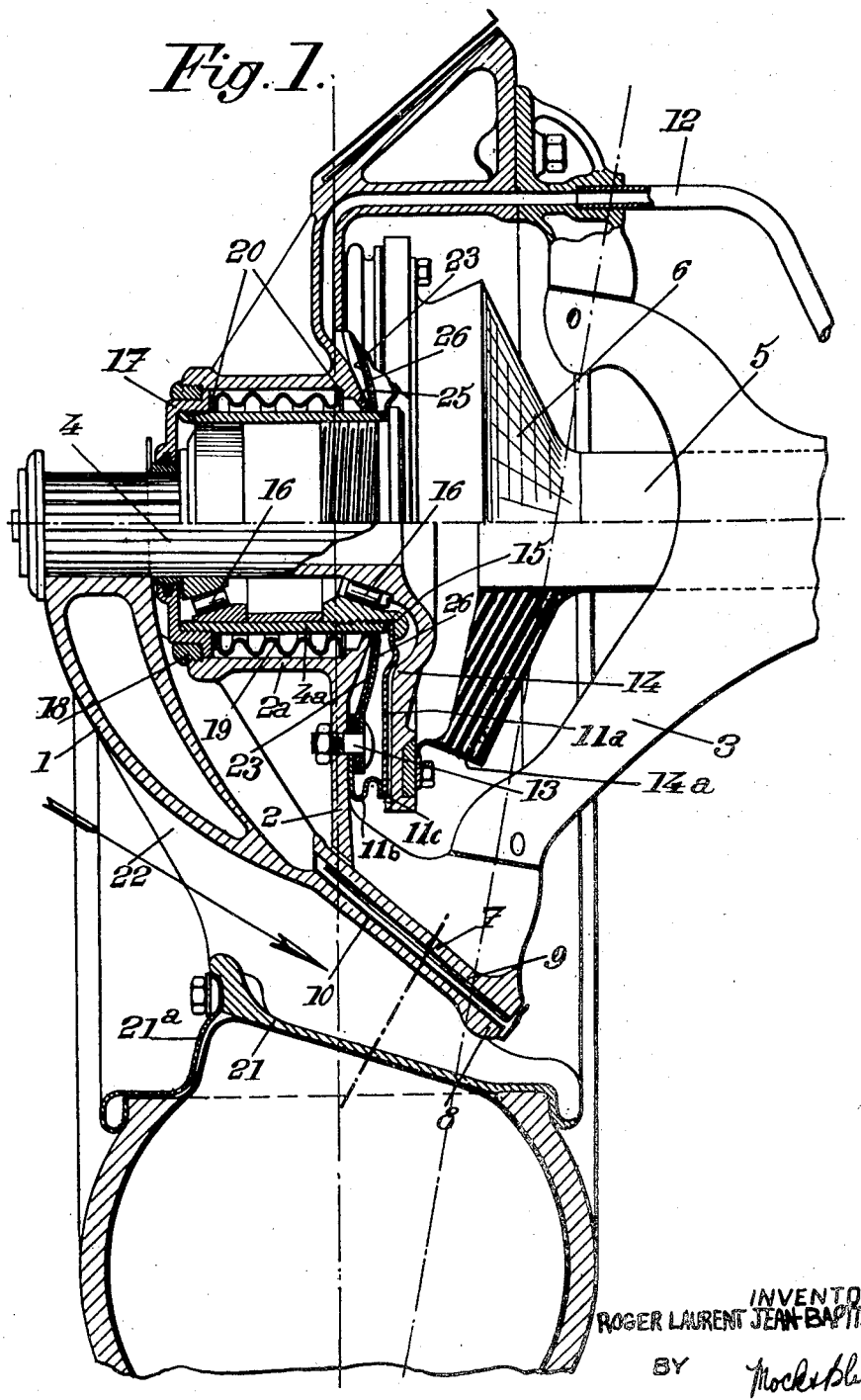
INVENTOR
ROGER LAURENT JEAN-BAPTISTE SANMORI
BY Mocks Blum
ATTORNEYS

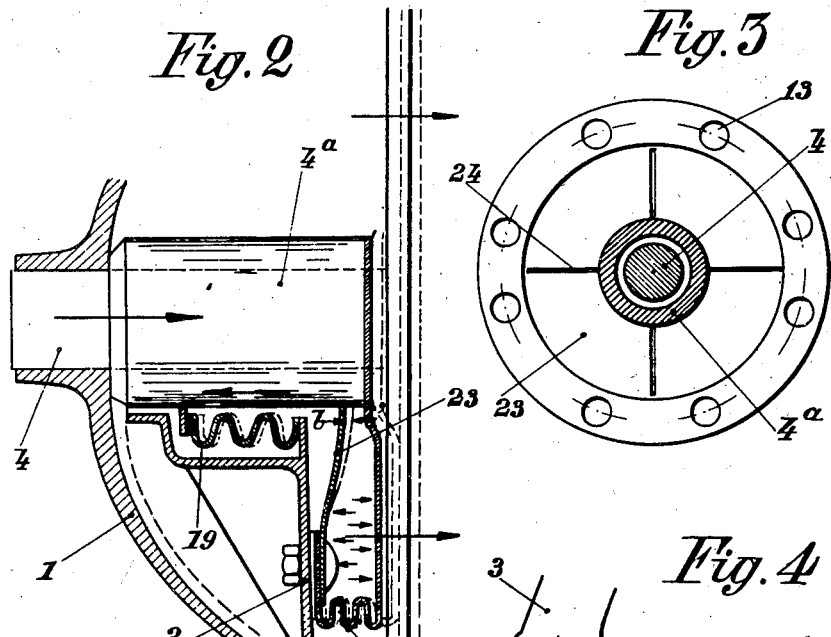
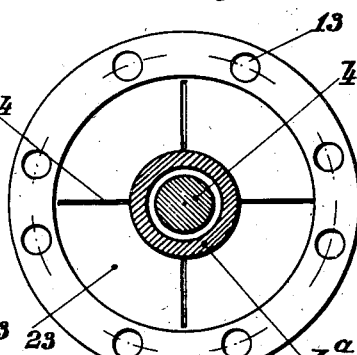
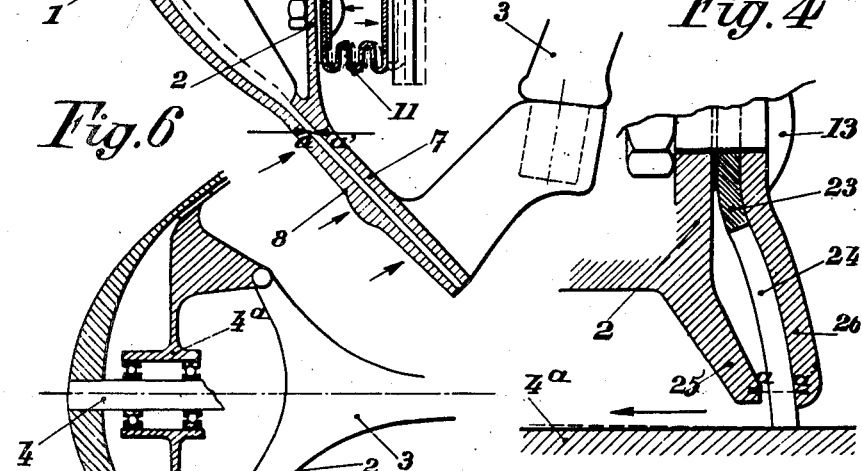
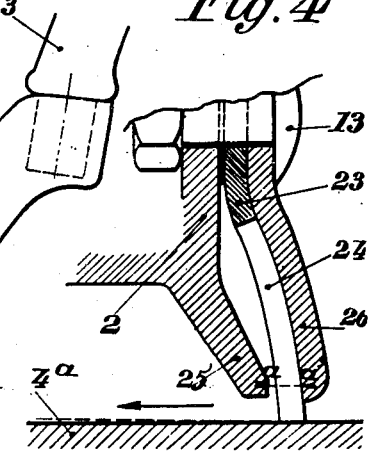
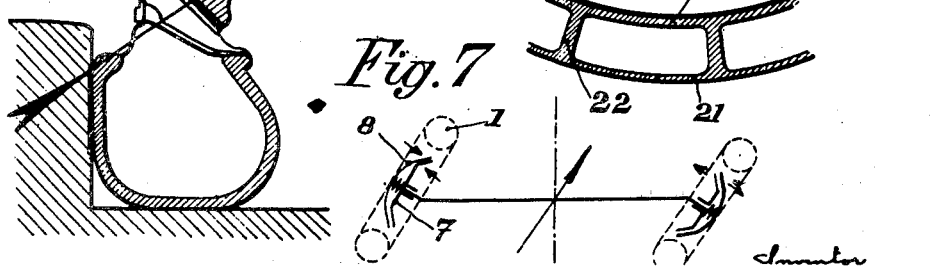

Patented Mar. 7, 1950

2,499,684

UNITED STATES PATENT OFFICE 2,499,684

BRAKE DEVICE

Roger Laurent Jean-Baptiste Sanmori, Monaco, Monaco

Application January 12, 1946, Serial No. 640,808
In France August 29, 1945

6 Claims. (Cl. 188—71)

The present invention relates to brakes, and more particularly, but not exclusively, brakes for automobile vehicles and especially touring cars.

Its chief object is to provide a brake device which is better adapted to meet the requirements of practice than those used up to the present time.

Preferred embodiments of my invention will be hereinafter described with reference to the accompanying drawings, given merely by way of example, and in which:

Fig. 1 shows, in partial axial section, a wheel fitted with a brake according to the invention;

Fig. 2 illustrates, in a diagrammatic manner, the operation of certain parts of this brake;

Fig. 3 is a front view of means for taking up play adapted to be used in connection with said brake;

Fig. 4 shows, on a larger scale and in axial section, a part of said means;

Fig. 5 shows a detail of construction of the wheel.

Finally, Figs. 6 and 7 are diagrams illustrating, in two different particular cases, the advantages of said brake.

In the following description it will be supposed that the invention is applied to the case of a touring car wheel 1, intended, for instance, to perform both driving and steering functions.

According to my invention, I provide, in the usual manner, at least two friction surfaces the cooperation of which ensures the desired braking effect, one of these friction surfaces rotating together with the wheel 1 to be braked, while the other is prevented from rotating, for instance by fixation to a plate 2 pivoted about a vertical axis in the forked end of a lever 3, so as to permit steering movements of the wheel. Plate 2 acts as support for the axle 4 of said wheel, which is driven by a shaft 5 through the intermediary of a joint 6 which constituted by a rubber mass of annular frusto-conical shape fixed on its inner periphery to the end of shaft 5 and on the outer periphery to an annular part 14a on a flange 14 of axle 4.

According to a feature of my invention, the brake is arranged in such manner that the relative displacement of the friction surfaces which is to ensure the braking action is obtained by axial displacement of the whole of wheel 1 and of the friction surface that turns together therewith.

Although the relative displacement of the friction surfaces might take place in a direction different from that of the wheel axis, it seems more advantageous, as it will be supposed in what follows, to arrange the friction surfaces, with respect to each other, in such manner that their engagement is produced by a relative displacement parallel to the wheel axis. Thus the above considered axial displacement of the wheel directly brings the rotating contact surface thereof into contact with the fixed friction surface without requiring the provision of any transmission means.

Advantageously, the friction surfaces are carried respectively by a male part 7 and a female part 8 coaxial with axle 4, the male part 7 being, for instance, carried by fixed plate 2 and provided with a friction lining 9, while the female part 8 is carried by the inner face of wheel 1 and advantageously fitted with a steel lining 10.

If the axial displacement of wheel 1 is toward the longitudinal middle plane of the vehicle, the apexes of the friction cones 7 and 8 are turned toward the outside of said vehicle.

The device further includes control means for producing, against the action of elastic return means, the axial displacement of wheel 1 that is to ensure the braking.

Before entering into complementary explanations concerning these control means, some of the advantages resulting from the feature of my invention just above set forth will be pointed out.

In particular and as diagrammatically shown by Fig. 6, any accidental lateral shock concerning wheel 1 has for its effect, either by compression of the return system of this wheel, or by mere elastic deformation of the web of said wheel, to bring into contact the corresponding conical surfaces 7 and 8 and to ensure the transmisison of the perturbing effort (represented by an arrow) directly to the lever 3 which supports wheel 1. As, in most cases, such a lateral shock takes place after the brake has been applied, for instance when the car is stopped along a sidewalk, wheel 1 is then blocked by its engagement with plate 2 and all the control means for ensuring rotation, pivoting or braking of said wheel are protected against the perturbing shock. It is therefore possible to provide a substantially lighter construction of said organs.

Another advantage of the arrangement results from the fact that, on curves or corners, the centrifugal force tends to move toward each other the friction surfaces of the brake of the wheel that is on the outside of the curve (diagram of Fig. 7), while it tends to move away from each other the friction surfaces of the inner wheel brake. This ensures a more intensive braking on the outer wheel, which just happens to be the one the speed of rotation and load of which are more important.

Concerning now the control means to be provided for producing the axial displacement of the wheel which is to ensure the braking action, they can be constituted in any conventional manner, but it seems particularly advantageous to have recourse, for this purpose, to another feature of the invention, according to which said means are constituted by a fluid control system the receiver part of which includes at least one expansible annular element 11a—11b mounted coaxially with wheel 1.

This feature permits of giving this receiving element 11a—11b a large diameter, and, consequently, of developing an important axial effort while keeping a relatively low control pressure. Therefore, it will thus be possible directly to control the displacements of the friction surfaces by means of a fluid under low pressure, for instance by means of air compressed at 8 or 10 kgs., which considerably reduces the risks of leakage and eventually permits, in case of leakage, of maintaining the braking effort as long as the rate of leakage does not get too close to the feed rate value.

Furthermore, the distribution of the braking pressure will take place in a uniform manner and receiving element 11a—11b, which expands parallel to the wheel axis, due to its coaxial mounting, will be able directly to attack the organs to be displaced, to wit wheel 1 and female cone 8, rigid with said wheel, without it being necessary to provide transmission means as is the case with the usual fluid controlled brakes.

In the embodiment shown by the drawing, the receiver element is constituted by a kind of annular bellows including a disc shaped portion 11a and a corrugated portion 11b, these portions having their outer edges assembled together by welding at 11c. The inner edge of portion 11B is fixed by rivets 13 to the inner face of the hub carrying plate 2. The inner edge of portion 11a is caught in a fluidtight manner between the edge of bush 4a and an annular flange 15 of the outer race of roller bearing 16. The space between portions 11a and 11b is connected through a conduit 12 with a source of compressed air with the interposition of controlled stopping means (not shown on the drawing) owing to which the driver can at will expand, or on the contrary, retract said bellows.

Portion 11a is adapted to bear, in the expanded position of the bellows, against plate 14 rigid with wheel axle 4.

I interpose, between plate 2 and an axle cap 17 fixed axially with respect to axle 4, and elastic means for urging axle 4 outwardly with respect to plate 2, the sliding displacements of said cap 17 with respect to said plate being guided, for instance, by a graphitized ring 18 screwed on the cylindrical projection 2a of plate 2; it should be noted that the translatory displacement to be provided for braking, against the action of said elastic means, can be relatively small, averaging for instance from 1 to 2 mms., owing to the regular and uniform manner in which the friction surfaces 9 and 10 are brought into contact with each other.

Such an elastic system is advantageously constituted by a metallic bellows 19 mounted coaxially with plate 2 between the cylindrical extension 2a of said plate and the bush 4a of roller bearings 16. Preferably, the ends of said bellows 19 bear on packing rings 20, in order to constitute, together with bellows 11a—11b, a fluidtight expansible space limited by bush 4a, bellows 19, a portion of the inner face of plate 2 and bellows 11a—11b.

This brake works as follows:

Fluid under pressure (which has been supposed to consist of compressed air but which might as well be a hydraulic fluid) is fed through conduit 12 into control bellows 11a—11b, which, expands axially until its portion 11a comes to bear, after a small displacement, against plate 14, rigid with the axle 4. From this time on, any supplementary expansion of bellows 11a—11b produces an axial displacement of the whole of axle 4, bush 4a and wheel 1 fixed thereon, and of the female cone 8 carried by said wheel, this axial displacement taking place in the direction which brings the friction surfaces 9 and 10 of the brake toward each other, that is to say in the direction that corresponds to braking, against the action of the return spring constituted by metallic bellows 19. The release of the brake is ensured by the action of said spring 19 as soon as bellows 11a—11b is placed in communication with a discharge conduit.

It should be noted that this return spring is to be so chosen that, on the one hand, it can be compressed by the effort developed by control bellows 11 when the latter is fed with compressed air, but that on the other hand its strength must however be sufficient for opposing any undesirable axial sliding displacement of wheel 1 under any conditions of utilization of the vehicle, in particular under the effect of the centrifugal force which tends to move the chassis toward the outer wheel, in the most unfavorable cases of cornerings that can be considered.

Although nothing has been said, in what precedes, concerning the structure of the wheel proper, it seems advantageous, in view of the characteristics of the brake that has just been described, to make it as follows:

According to a construction illustrated by Figs. 1 and 5, the drum of wheel 1 is connected to the rim 21 of said wheel, through a plurality of fins or blades 22, preferably having curved leading edges, disposed radially like the blades of a fan rotor, said fins efficiently ensuring the flow of a stream of cooling air toward the brake friction surfaces.

According to another feature, which has already been used for other purposes, in a French application filed by me on August 16, 1945, No. 501,674, rim 21 is made of two portions one of which, the one which corresponds to the inner part of the rim, is connected to the wheel drum by blades 22, while the other, which corresponds to the outer edge of said drum, is constituted by an annular flange 21a. Said flange is then given a certain elasticity, whereby lateral shocks applied to the wheel and causing the blocking of said wheel against the hub supporting drum as already mentioned with reference to the diagram of Fig. 6, do not produce any permanent deformation of the wheel support, but are elastically absorbed, the deformations that are imposed being supported only by this flange 21a the replacement of which might in any case be performed quickly and at little cost in case of deterioration.

According to still another feature, which can be applied to any brakes in which the friction surfaces are brought toward each other by an axial relative displacement, but which will be supposed, in what follows, to be applied to the brake above described, I provide, for taking up the play that results from wear and tear of the cooperating braking parts, means automatically operated by frictional wedging. An embodiment of such means is illustrated by Figs. 1 to 4.

It includes an annular disc 23 arranged to bear upon the outer wall of bush 4a (slidable together with sliding axle 4), this disc being fixed at its periphery to plate 2, for instance by means of the very rivets that serve to the fixation of control bellows 11, the inner edge of this disc coming to bear in a frictional manner against said bush 4ª.

This disc is given a certain elasticity enabling it to undergo temporary deformations in a direction perpendicular to its plane, for instance by providing therein a plurality of radial slots 24.

This disc 23 is fitted by forcing on bush 4a with a certain deformation, so that it tends to yield elastically to axial displacements of a direction corresponding to the brake being applied, while it tends to wedge, under the effect of displacements in the opposed direction.

Advantageously, this disc 23 acts at the same time as support and guide for the inner end of bush 4a the outer end of which is supported and guided, through the intermediary of cap 17 by graphitized ring 18.

An abutment 25, rigid with the hub carrier 2, is provided in such manner that, for displacements of the axle 4 in the brake release direction (as indicated by the arrow on Fig. 4) of an amplitude greater than the clearance a, a' that is tolerated between parts 7 and 8 in the inoperative position of the brake, it stops disc 23 which is then wedged with respect to bush 4a, and prevents any supplementary axial displacement of said bush in the brake release direction.

Preferably, I also provide a second abutment 26, constituted for instance by an annular disc rigid with plate 2 and mounted coaxially with axle 4. This abutment 26 is disposed opposite abutment 25 and at a distance thereof corresponding to the clearance a—a' above referred to, so that, when the inner edge of disc 23 has been moved by frictional engagement with bush 4a, a distance corresponding to this clearance a—a', abutment 26 stops disc 23 and causes a relative axial sliding displacement to take place between bush 4a and the edge of disc 23.

The operation of this device is as follows:

As long as there is no wear of the brake friction surfaces, the axial displacement necessary for bringing these surfaces into contact remains substantially equal to the predetermined clearance aa'; for the whole time of this displacement, the edge of disc 23 that bears on bush 4a undergoes no relative displacement with respect to said bush and it is driven along by friction by the latter in all its axial displacements; but as soon as a wear of the friction surfaces intervenes, which necessitates a displacement of bush 4a of an amplitude greater than aa' disc 23 comes to bear against abutment 26 and there takes place, between bush 4a and the contact edge of disc 23, an axial sliding (shown in dotted lines in Fig. 2) which corresponds to the play bb' to be taken up. From this time on, as abutment 25 limits the amplitude of the axial displacements of bush 4a to values equal to aa', the position of rest of bush 4a at the end of the brake release is modified so as to restore the distance between parts 7 and 8 to a value equal to clearance a—a'. The axial displacements of axle 4 then again take place without relative sliding of the edge of disc 23 with respect to bush 4a, as long as the amplitude of the displacement necessary for applying the brake does not again exceed the clearance aa' provided between abutments 25 and 26.

Of course, the features which have just been specified are applicable whether the wheel is a steering or a non-steering one.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. In a vehicle including a wheel support and a wheel journalled with respect to said support, a brake device which comprises, in combination, two coaxial annular friction pieces fixed to said support and said wheel respectively and adapted to cooperate with each other, two coaxial parts axially fixed with respect to said friction pieces respectively, means for axially moving said wheel and wheel support to bring said two friction pieces into braking contact with each other, one of said parts including a cylindrical surface, a plurality of radially disposed flexible plates fixed at the periphery to the other of said parts having their edges opposed to said periphery applied against said surface, said edges being inclined with respect to said surface so as to permit relative sliding displacements in the direction corresponding to the engagement of said friction pieces with each other but to produce wedging of said edges on said surface for the opposed direction of relative displacement, and abutments carried by the part to which said plates are fixed for limiting the amplitude of oscillation of said edges to a value equal to the desired amplitude of displacement of said friction pieces with respect to each other.

2. In a vehicle, the combination of a wheel support, a wheel rotatable in said support and slidable axially therein, two coaxial annular brake members fixed to said support and said wheel respectively and adapted to cooperate with each other, means for axially moving said wheel with respect to said support to bring said brake members into braking engagement with each other, a wheel axle rigid with said wheel, an annular part axially fixed on said axle and freely journalled thereon, a plurality of flexible plates radially disposed about said part, the outer ends of said plates being fixed to said wheel support and the inner edges of said plates being applied against said annular part so that the whole of said plates forms a bearing for said annular part, said edge of each of said plates being inclined to the outer surface of said annular part against which it is applied so as to permit axial sliding of said part along said edge in the direction corresponding to engagement of said brake members with each other, but to cause wedging of said edge on said surface for axial sliding of said part in the opposed direction, and abutments carried by said wheel support for limiting the amplitude of oscillation of said edges to a value equal to the desired amplitude of displacement of said brake members with respect to each other.

3. In an automobile vehicle including a wheel support carried by said vehicle and a wheel journalled with respect to said support, a brake device which comprises, in combination, two coaxial annular friction pieces fixed to said support and said wheel, respectively, and adapted to cooperate with each other for braking purposes, an axle rigid with said wheel, a member coaxial with said axle and freely rotatable with respect thereto, said member being adjustably carried by said support so as to be slidable with respect thereto in the direction of the wheel axis, anti-friction thrust bearing means between said member and said axle for transmitting to said axle axial displacements of said member with respect to said support, and means operable for adjusting the axial position of said member with respect to said support so as to move said annular friction pieces in or out of engagement with each other.

4. A brake device according to claim 3 in which the annular friction piece fixed to the wheel is on the outer side of the annular friction piece fixed to the wheel support.

5. In an automobile vehicle including a wheel support carried by said vehicle and a wheel journalled with respect to said support, a brake device which comprises, in combination, two coaxial conical annular friction pieces fixed to said support and said wheel, respectively, and adapted to cooperate with each other for braking purposes, an axle rigid with said wheel, a member coaxial with said axle and freely rotatable with respect thereto, said member being adjustably carried by said support so as to be slidable with respect thereto in the direction of the wheel axis, anti-friction thrust bearing means between said member and said axle for transmitting to said axle axial displacements of said member with respect to said support, and means operable for adjusting the axial position of said member with respect to said support so as to move said annular friction pieces in or out of engagement with each other.

6. In an automobile vehicle including a wheel support carried by said vehicle and a wheel journalled with respect to said support, a brake device which comprises, in combination, two coaxial conical annular friction pieces fixed to said support and said wheel, respectively, and adapted to cooperate with each other for braking purposes, said conical friction pieces having their apexes toward the outside of the vehicle, an axle rigid with said wheel, a member coaxial with said axle and freely rotatable with respect thereto, said member being adjustably carried by said support so as to be slidable with respect thereto in the direction of the wheel axis, anti-friction thrust bearing means between said member and said axle for transmitting to said axle axial displacements of said member with respect to said support, and means operable for adjusting the axial position of said member with respect to said support so as to move said annular friction pieces in or out of engagement with each other.

ROGER LAURENT JEAN-
BAPTISTE SANMORI.

REFERENCES CITED

The following references are of record in the file of this patent:

UNITED STATES PATENTS

| Number | Name | Date |
|---|---|---|
| 1,755,829 | Loughead | Apr. 22, 1930 |
| 2,157,473 | Best | May 9, 1939 |
| 2,236,655 | Viau | Apr. 1, 1941 |
| 2,303,710 | Sinclair | Dec. 1, 1942 |

FOREIGN PATENTS

| Number | Country | Date |
|---|---|---|
| 321,479 | Italy | Oct. 6, 1934 |
| 539,041 | Great Britain | Aug. 26, 1941 |